United States Patent [19]
Seith et al.

[11] Patent Number: 6,161,627
[45] Date of Patent: Dec. 19, 2000

[54] PARTICLE SEPARATOR AND PNEUMATIC TOOL INCORPORATING SAME

[75] Inventors: Warren A. Seith; Louis J. Colangelo, III, both of Bethlehem; Thomas Mancuso, Allentown, all of Pa.

[73] Assignee: Ingersoll-Rand Company, Woodcliff Lake, N.J.

[21] Appl. No.: 09/337,169

[22] Filed: Jun. 21, 1999

[51] Int. Cl.[7] .................................................. B23B 45/04
[52] U.S. Cl. ...................... 173/93.5; 173/218; 173/168; 173/169; 173/171; 55/282; 55/450; 55/457
[58] Field of Search .......................... 173/93, 93.5, 171, 173/170, 168, 169, 218, 221; 55/282, 447, 450, 455, 457

[56] References Cited

U.S. PATENT DOCUMENTS

| | | | |
|---|---|---|---|
| 2,616,519 | 11/1952 | Crankshaw et al. | 183/75 |
| 3,442,337 | 5/1969 | Astrom | 173/61 |
| 3,661,217 | 5/1972 | Maurer | 173/93.5 |
| 3,725,271 | 4/1973 | Giannotti | 210/65 |
| 3,970,439 | 7/1976 | Murphay | 55/306 |
| 4,089,665 | 5/1978 | Brookman | 55/457 |
| 4,162,906 | 7/1979 | Sullivan et al. | 55/346 |
| 4,469,497 | 9/1984 | Linhardt | 55/282 |
| 4,512,759 | 4/1985 | Alink et al. | 494/14 |
| 4,569,687 | 2/1986 | Feng | 55/345 |
| 4,643,158 | 2/1987 | Giannotti | 123/591 |
| 5,020,607 | 6/1991 | Sentivan | 173/171 |
| 5,178,656 | 1/1993 | Schott | 55/450 |
| 5,228,244 | 7/1993 | Chu | 51/273 |
| 5,343,831 | 9/1994 | Collins | 123/41.65 |
| 5,560,547 | 10/1996 | Mutter et al. | 239/433 |
| 5,591,070 | 1/1997 | Kachich | 173/169 |
| 5,913,370 | 6/1999 | Chapelle et al. | 173/218 |
| 5,918,686 | 7/1999 | Izumisawa | 173/221 |
| 6,044,917 | 4/2000 | Brunhoelzl | 173/168 |

FOREIGN PATENT DOCUMENTS

| | | |
|---|---|---|
| 416390 | 9/1924 | Germany . |
| 662122 | 5/1979 | Russian Federation . |
| 662123 | 5/1979 | Russian Federation . |

*Primary Examiner*—Scott A. Smith
*Attorney, Agent, or Firm*—Leon Nigohosian, Jr.

[57] ABSTRACT

A particle separator and a pneumatic tool incorporating the same for separating particles from a fluid passed therethrough. The particle separator includes an inlet passageway having an upstream end and a downstream end and an inlet which is in fluid communication with the downstream end of the inlet passageway. A separation passageway is connected to the downstream end of the inlet passageway and connected via a substantially "U"-shaped passageway to a chamber. The inlet passageway, separation passageway, and substantially "U"-shaped passageway are connected in fluid communication to provide a flow path to the chamber. In one embodiment, the chamber of the particle includes a removable plug. In another embodiment, the chamber is vented to provide a bleed-path from the separator passageway to and out of the chamber. Preferably, the bleed-path comprises a labyrinth seal which in a preferred embodiment includes a plug having threads disposed within the chamber.

12 Claims, 5 Drawing Sheets

PARTICLE SEPARATOR AND PNEUMATIC TOOL INCORPORATING SAME

BACKGROUND OF THE INVENTION

The present invention relates generally to particle separators and more particularly to pneumatic tools incorporating the same. In many industrial applications, pneumatic tools ingest dirt, rust and other particulate contaminates which are carried by the motive air supplied to the tool. Typically these contaminates are introduced into the air inlet of the tool by a source of compressed air which is contaminated. When ingested by pneumatic tools, these particles cause accelerated wear on moving parts within the tools thereby substantially reducing the life and performance of these tools.

To combat this problem, some industrial facilities install filters in the air supply lines near the point of use. This solution is cumbersome, however, and is effective only as long as the filtering elements of the filter are replaced when they become plugged. Because they restrict air flow, plugged filters also reduce tool performance. Due to the high maintenance required, filters are often an ineffective solution for ensuring that a clean air supply is provided to pneumatic tools.

Particles may also be introduced into a tool by air-line quick connectors in an air supply line. When a tool is disconnected from an air supply line, e.g., to change the pneumatic tool or move the tool to another supply hose location, these particles are free to enter the air inlet or the air-line quick connector of the tool. Thus, point of use filters are ineffective at preventing introduction of particles upon disconnecting a pneumatic tool.

Various prior art devices have been proposed to separate particulate matter from fluid streams. These prior art devices have been less than adequate and suffer from a variety of drawbacks. Among these drawbacks is the inability of a number of prior art designs to be incorporated into a pneumatic hand tool due to their large cumbersome designs.

The foregoing illustrates limitations known to exist in present particle separators and pneumatic tools. Thus it is apparent that it would be advantageous to provide an alternative directed to overcoming one or more of the limitations set forth above. Accordingly an apparatus for separating particulate matter from an air stream and pneumatic tools incorporating the same are provided including the features more fully disclosed hereinafter.

SUMMARY OF THE INVENTION

According to the present invention, a particle separator and a pneumatic tool incorporating the same are provided for separating particles from a fluid passed therethrough. The particle separator includes an inlet passageway having an upstream end and a downstream end and an inlet which is in fluid communication with the downstream end of the inlet passageway. A separation passageway is connected to the downstream end of the inlet passageway and connected via a substantially "U"-shaped passageway to a chamber. The inlet passageway, separation passageway, and substantially "U"-shaped passageway are connected in fluid communication to provide a flow path to the chamber.

In one embodiment, the chamber of the particle includes a removable plug. In another embodiment, the chamber is vented to provide a bleed-path from the separator passageway to and out of the chamber. Preferably, the bleed-path comprises a labyrinth seal which in a preferred embodiment includes a plug having threads disposed within the chamber.

The foregoing and other aspects will become apparent from the following detailed description of the invention when considered in conjunction with accompanying drawing figures.

DETAILED DESCRIPTION OF THE PREFERRED EMBODIMENTS

Figure 1:
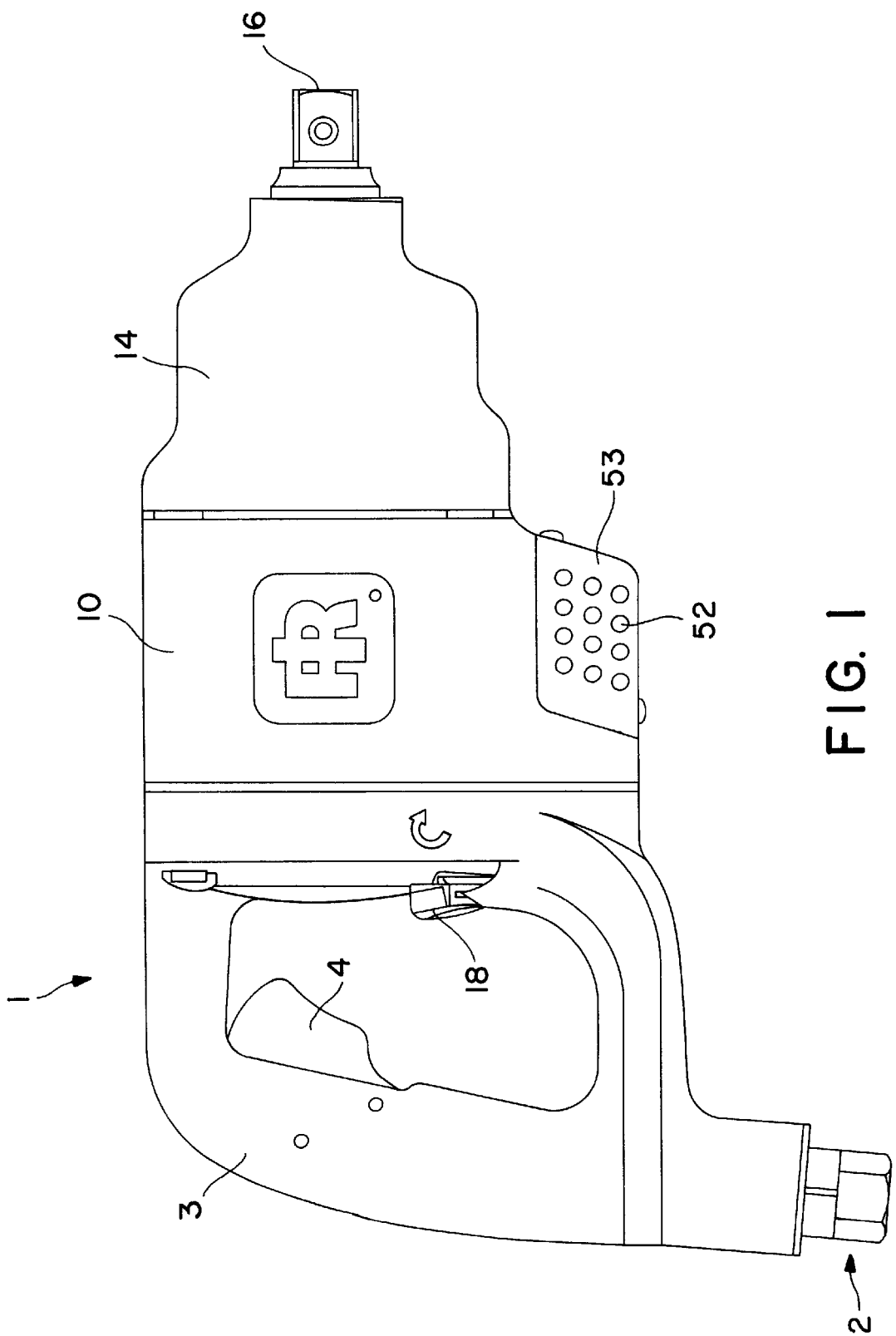
FIG. 1 is a planar view of a pneumatic impact tool incorporating an inertial separator according to the present invention.

The invention is best understood by reference to the accompanying drawings in which like reference numbers refer to like parts. It is emphasized that, according to common practice, the various dimensions of the components shown in the drawings are not to scale and have been enlarged for clarity.

Figure 2:
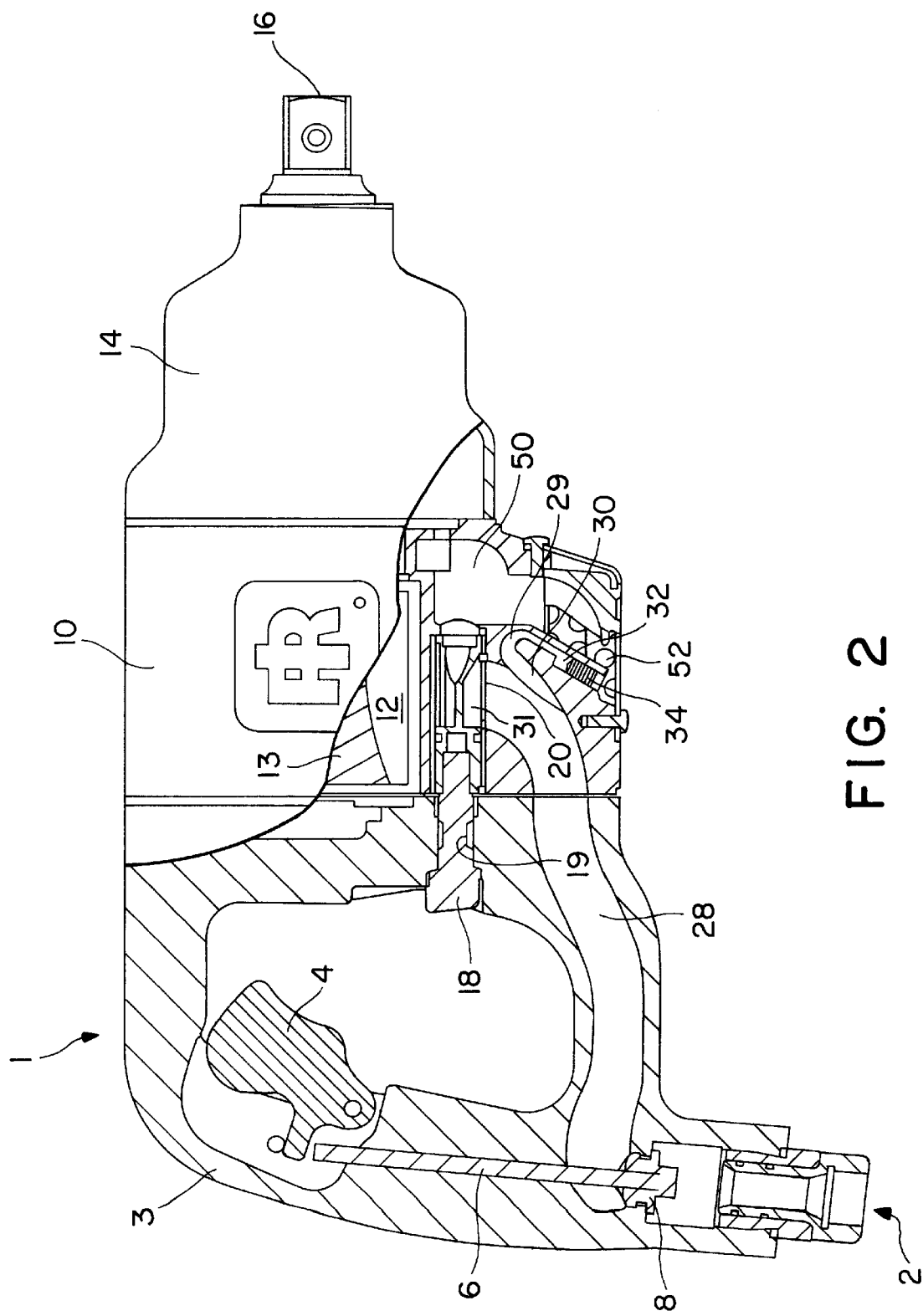
FIG. 2 is a partial sectional view of the pneumatic impact tool of FIG. 1 showing the inertial separator according to the present invention.

Referring now to the drawings, shown in FIGS. 1 and 2 is a pneumatic tool 1 having a particle separator according to the present invention. Pneumatic tool 1 is provided with a handle 3 having a pneumatic fluid or air inlet 2 for providing motive fluid to a pneumatic operated motor or air motor 13 disposed in a motor housing 10. Air is supplied to the air motor through an inlet passageway 28. A tilt valve 8 is operated by means of a trigger 4 and actuating rod 6 to admit pressure fluid to inlet passageway 28.

Disposed within a chamber 19 are a rotary spool element combined with a reverse mechanism 18 which together provide a reversing valve means for selectively distributing pressure fluid between a forward supply port or a reverse supply port as described briefly below. Rotating the rotary spool element 20 switches the flow direction of motive fluid to either forward or reverse drive the motor as is known in the art. Upon moving reverse mechanism 18, the rotary spool element is selectively moved to direct air from an inlet 31 to drive the air motor in forward or reverse direction so that air expands against the vanes 12 to rotate air motor 13. Air motor 13, in turn, is connected to and rotates a hammer mechanism (not shown) disposed in a hammer mechanism housing 14 which drives an output shaft 16. Hammer mechanisms useful in the pneumatic tool shown are known in the art and include those disclosed in U.S. Pat. No. 3,661,217 issued to Spencer Maurer, which patent is incorporated herein by reference.

Expanded air exhausts the motor via exhaust passageway 50 which exits through exhaust vents 52 of a vent cover 53 to atmosphere.

Referring to FIG. 2, a separation passageway 30 according to the present invention is shown installed between inlet passageway 28 and exhaust vent 52. Shown in increasingly greater detail in FIGS. 3 and 4, separation passageway 30 comprises a passageway that is in fluid communication with inlet passageway 28 at the downstream end. The passageway of separation passageway 30 is a relatively straight path from which inlet passageway 28 diverges upward and away from prior to reaching the inlet 31 which leads to motor 13.

Separation passageway 30 terminates in a substantially "U"-shaped passageway 29 having a tight radius bend that leads into a chamber 32. Because particulate matter in an air stream has a higher inertia than the air molecules in which they are suspended, upon flowing supply air from inlet 2 through inlet passageway 28 to inlet 31, particles entrained in the air stream are caused to follow a straight trajectory into separation passageway 30 through "U"-shaped passageway 29 and then into chamber 32. Although the angle at which the inlet passageway 28 diverges upward and away from separation passageway 30 is not critical, it will be readily recognized by those skilled in the art that by larger diverging angles, more particles will be recovered by the separator. Similarly, it will also be readily recognized that by increasing the degree to which the "U"-shaped passageway is bent will also increase the number of particles recovered by the separator.

Chamber 32 may be provided with a removable plug and used as a collection chamber to trap particles, which is periodically emptied when filled.

In a preferred embodiment, described in detail below, chamber 32 is vented to a neutral location, e.g., by porting to atmosphere through the motor exhaust, to provide for a continuous, self-purging operation while the tool is operating. This self-purging feature is accomplished by providing a bleed-path from separation passageway 30 to the tool exhaust vent 52 to continuously remove unwanted particles from chamber 32 while diverting the majority of the airflow to the motor 12.

Figure 5:
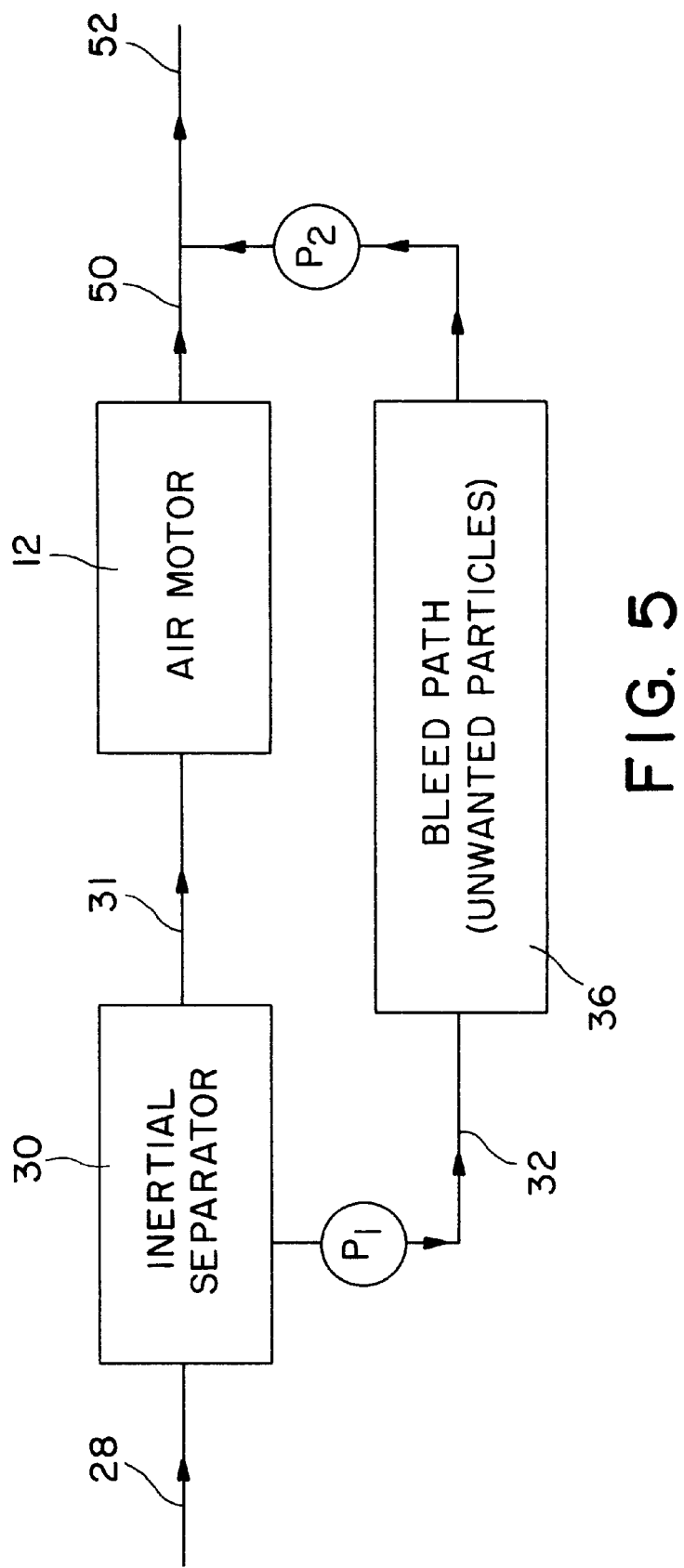
FIG. 5 is a block diagram that schematically illustrates the operation of the self-purging feature of an inertial separator according to one embodiment of the present invention.

Shown in the block diagram of FIG. 5 is a schematic representation of the operation of a self-purging inertial separator according to the present invention. In order for a pneumatic tool to function, the air pressure at the chamber 32 (shown in the schematic as Pi) which communicates with separation passageway 30 must be greater than the air pressure of the tool exhaust (shown in the schematic as P2) to maintain a mass flow rate of air through the motor 12. Thus, a bleed-path 36 from separation passageway 30 to the tool exhaust vent 52 must be limited significantly to a small fraction of the flow rate from inlet 31 through motor 12. Although a single, small orifice (i.e., a small hole) located between chamber 32 and exhaust vent 52 would limit the bleed-path air flow, this type of bleed path would quickly become clogged with the particulate matter it was intended to pass.

Figure 3:
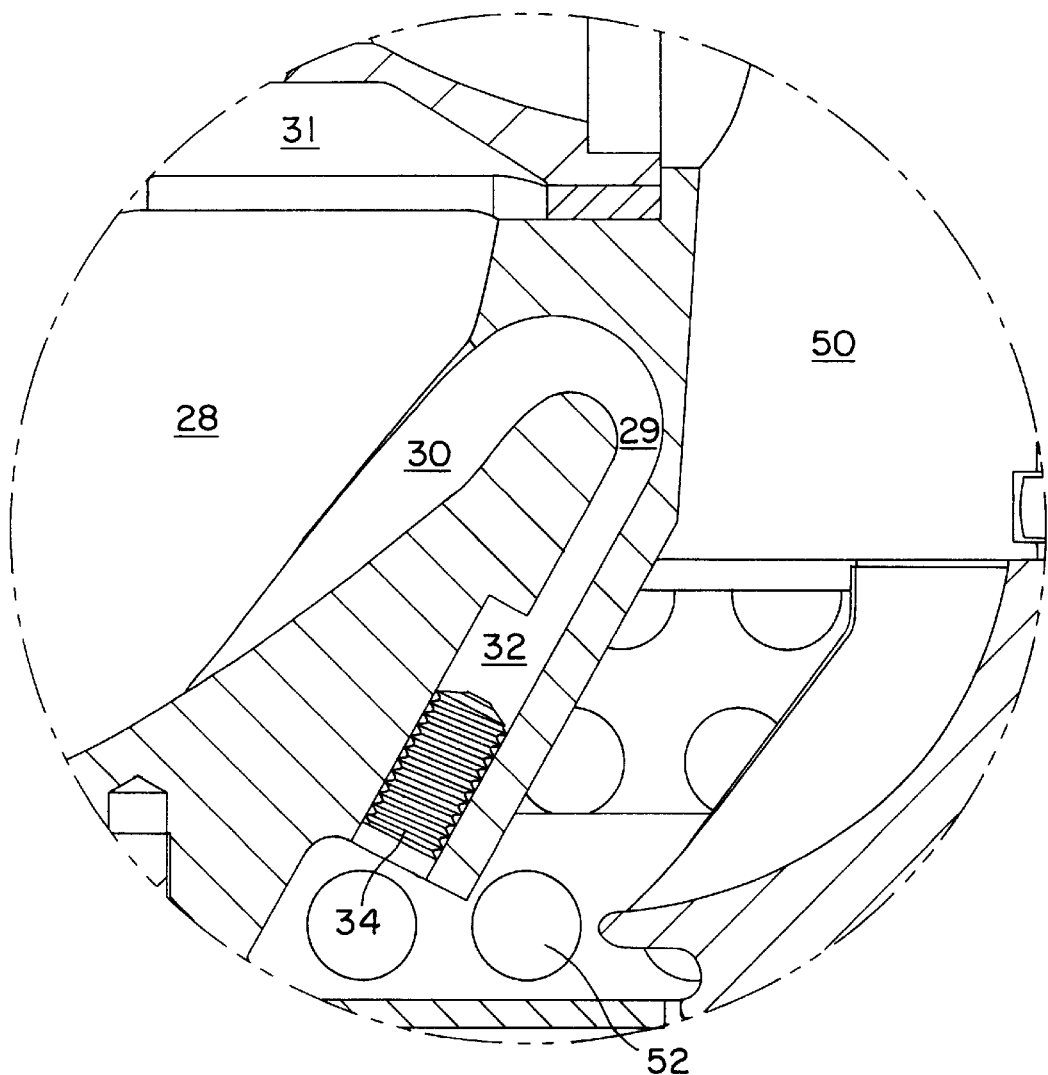
FIGS. 3 and 4 are increasingly enlarged views of the inertial separator shown in FIG. 2.
Figure 4:
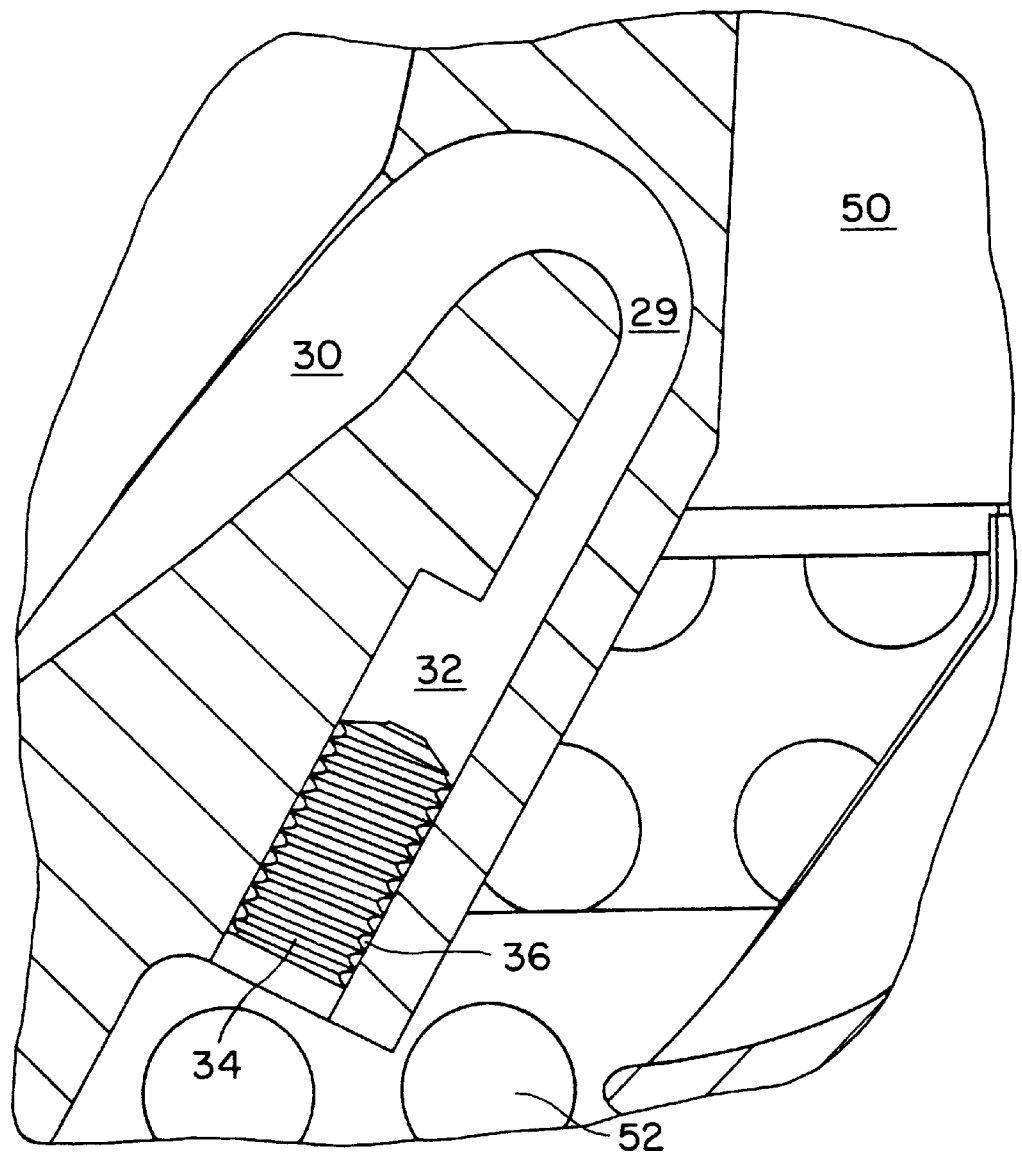

In a preferred embodiment shown in detail in FIGS. 3 and 4, chamber 32 is vented to a neutral location using a bleed-path provided by a labyrinth seal. This labyrinth seal is provided by inserting a threaded plug 34 such as a set screw having outer diameter of the threads which is slightly greater than the inner diameter of chamber 32 and an inner thread diameter which is less than the inner diameter of chamber 32. Upon threading threaded plug 34 into chamber 32 to create an interference fit with the threads, a helical bleed path 36 is formed between the inner thread diameter of the threaded plug and the wall of chamber 32 as shown in detail in FIG. 4. The helical bleed path 36 both limits the mass flow rate of air through the bleed path while allowing the passage of large particles through a tortuous path. Moreover, the helical bleed path limits the amount of flow more than that provided by a simple orifice of similar cross-section. This is due both to the flow path length around the threaded fastener and the increased pressure drop of turning the flow.

As will be readily recognized by those having skill in the art, the thread size of threaded plug 34 is selected to provide a cross-section which permits flow through of the particles which are to be separated. It will also be recognized that the length of the threaded plug may be varied to vary the pressure drop to optimize the mass flow rate through the motor.

Thus, according to the present invention an inertial separator is provided which has a compact design capable of being incorporated easily into a pneumatic hand tool and which removes particles from the compressed air supplied to the pneumatic tool before reaching the vane motor. In one embodiment of the present invention, the inertial separator is provided with a bleed circuit to scavenge dirt out of the separator thereby providing for self-purging operation. Moreover, because the bleed circuit prevents removed particles from reentering the air supply stream and does not rely on gravity to accomplish this, the self-purging inertial separator operates regardless of the orientation of the tool or other device in which it is incorporated.

While embodiments and applications of this invention have been shown and described, it will be apparent to those skilled in the art that many more modifications are possible without departing from the inventive concepts herein described. For example, although shown and described above embodied in a pneumatic tool having an impact mechanism, it is to be understood that this is illustrative of only one manner in which the inertial separator may be utilized. It will be readily recognized by those skilled in the art that the inertial separator according to the present invention may be used with other pneumatic tools, including those other than impact tools. Other uses, which will be readily apparent, include applications in which particles are to be separated from a fluid stream in which the particles are entrained.

It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A particle separator for separating particles from a fluid passed therethrough, said particle separator comprising:

an inlet passageway having an upstream end and a downstream end;

an inlet in fluid communication with said downstream end of said inlet passageway;

a separation passageway connected to said downstream end of said inlet passageway;

said separation passageway connected via a substantially "U"-shaped passageway to a chamber; and said inlet passageway, said separation passageway, and said substantially "U"-shaped passageway being connected in fluid communication to provide a flow path to said chamber.

2. The particle separator for separating particles according to claim 1, wherein said chamber comprises a removable plug.

3. The particle separator for separating particles according to claim 1, wherein said chamber is vented to provide a bleed-path from said separator passageway to and out of said chamber.

4. The particle separator for separating particles according to claim 3, wherein said bleed-path comprises a labyrinth seal.

5. The particle separator for separating particles according to claim 4, wherein said labyrinth seal comprises a plug having threads disposed within said chamber.

6. The particle separator for separating particles according to claim 5, wherein an outer diameter of said threads is greater than an inner diameter of said chamber and an inner diameter of said threads is less than said inner diameter of said chamber.

7. A pneumatic tool comprising:

an inlet passageway having an upstream end and a downstream end;

an inlet in fluid communication with said downstream end of said inlet passageway;

an air motor in fluid communication with said inlet;

a separation passageway connected to said downstream end of said inlet passageway;

said separation passageway connected via a substantially "U"-shaped passageway to a chamber; and said inlet passageway, said separation passageway, and said substantially "U"-shaped passageway being connected in fluid communication to provide a flow path to said chamber.

8. The pneumatic tool according to claim 7, wherein said chamber comprises a removable plug.

9. The pneumatic tool according to claim 7, wherein said chamber is vented to provide a bleed-path from said separator passageway to and out of said chamber.

10. The pneumatic tool according to claim 9, wherein said bleed-path comprises a labyrinth seal.

11. The pneumatic tool according to claim 10, wherein said labyrinth seal comprises a plug having threads disposed within said chamber.

12. The pneumatic tool according to claim 11, wherein an outer diameter of said threads is greater than an inner diameter of said chamber and an inner diameter of said threads is less than said inner diameter of said chamber.

* * * * *